(12) United States Patent
Dawson et al.

(10) Patent No.: US 8,186,960 B2
(45) Date of Patent: May 29, 2012

(54) REPAIR OF ROTOR BLADE ROOTS

(75) Inventors: Mark Dawson, Boise, ID (US); Jack Wallace, Yucaipa, CA (US)

(73) Assignee: Frontier Pro Services, LLC, West Conshohocken, PA (US)

( * ) Notice: Subject to any disclaimer, the term of this patent is extended or adjusted under 35 U.S.C. 154(b) by 713 days.

(21) Appl. No.: 12/340,154

(22) Filed: Dec. 19, 2008

(65) Prior Publication Data

US 2010/0158661 A1   Jun. 24, 2010

Related U.S. Application Data

(60) Provisional application No. 61/045,043, filed on Apr. 15, 2008.

(51) Int. Cl.
*F03D 11/00*   (2006.01)

(52) U.S. Cl. .............. 416/204 R; 416/62; 416/248

(58) Field of Classification Search .......... 416/62, 416/204 R, 248
See application file for complete search history.

(56) References Cited

U.S. PATENT DOCUMENTS

| | | | |
|---|---|---|---|
| 4,915,590 A * | 4/1990 | Eckland et al. .............. 416/225 |
| 6,902,370 B2 | 6/2005 | Dawson et al. | |
| 2007/0154317 A1 * | 7/2007 | Cairo ............................ 416/230 |

* cited by examiner

*Primary Examiner* — Zandra Smith
*Assistant Examiner* — Jamie C Niesz
(74) *Attorney, Agent, or Firm* — Banner & Witcoff, Ltd.

(57) ABSTRACT

A method for repairing a wind turbine is described. The method may include preparing the surface of the blade, removing a plurality of mounting bolts, and replacing the mounting bolts with rod members. The rod members may be bonded to the blade root thereby strengthening the blade root and/or repairing any damaged or weakened regions. This repair may be performed on blades and blade coupling regions of various characteristics as well in modular fashion using pre-molded sections attached together around the blade root. The method of repair may be performed while the blade is still attached to the turbine hub. Wind turbines repaired according to these methods are also described. The method may also be used for attaching and otherwise handling new turbine blades and new wind turbines.

8 Claims, 15 Drawing Sheets

REPAIR OF ROTOR BLADE ROOTS

FIELD OF THE INVENTION

The invention relates generally to wind turbines. More specifically, the invention relates to repair of wind turbines including the repair and construction of blade roots of wind turbines.

BACKGROUND OF THE INVENTION

Wind turbines are known. They are renewable energy devices that may provide energy with minimal to zero environmental affects. Global energy demand continues to increase as a result of continued industrialization and population increase. Likewise, environmental concerns also continue to play more significant roles in economies and industries across the globe including concerns relating to air quality, draining of natural resources, and global warming, to name a few. Accordingly, innovation relating to renewable energy methods and devices and wind turbines in particular is of significant interest, importance and attention. Wind turbines and methods of operating, maintaining, controlling and otherwise using wind turbines are of significant interest and research as they relate to energy production and consumption as well as the preservation of the environment and other natural resources.

BRIEF SUMMARY OF THE INVENTION

To overcome limitations in the prior art described above, and to overcome other limitations that will be apparent upon reading and understanding the present specification, the present invention is directed to wind turbines and wind turbine repair.

A first aspect of the invention provides a wind turbine with a turbine hub and a plurality of blades. Each blade has an associated flange and blade root. The blade is coupled to the turbine hub via the flange and held together by a plurality of threaded attachments that are bonded to the blade root to vary the load path providing strength and support. The bond may be made from a number of materials including fiberglass and epoxy. Alternatively, pre-molded sections may be attached to the blade root in various configurations to vary the load path and provide strength and support. Accordingly, the pre-molded sections may also engage and be connected to another portion of the blade including the remainder of the blade that extends to the tip. The wind turbine itself may be any of a number of wind turbine designs. The wind turbine is connected to a transformer to facilitate power capture and generation.

A second aspect of the invention provides for a method of repairing a wind turbine by preparing an outer surface of a blade root for repair, removing a bolt configured to facilitate coupling of a blade flange to a turbine hub and replacing the bolt with a threaded attachment, and applying a bond to a region adjacent to the threaded attachment and the outer surface of the blade, coupling the blade to the threaded attachment This process may be repeated until all of the bolts surrounding the blade root and have been replaced with threaded attachments and bonded as described. Further, the coupling elements may be divided into sections. Accordingly, the bolts of given sections may be replaced as described allowing the bonds to cure before moving to the next section until all the sections have been repaired and/or strengthened as the load path is varied accordingly. Likewise, pre-molded sections may be attached or bonded to the blade root and together to vary the load path and provide stability and strength. In this manner, the blade root may be repaired without costly removal of the blade from the wind turbine.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
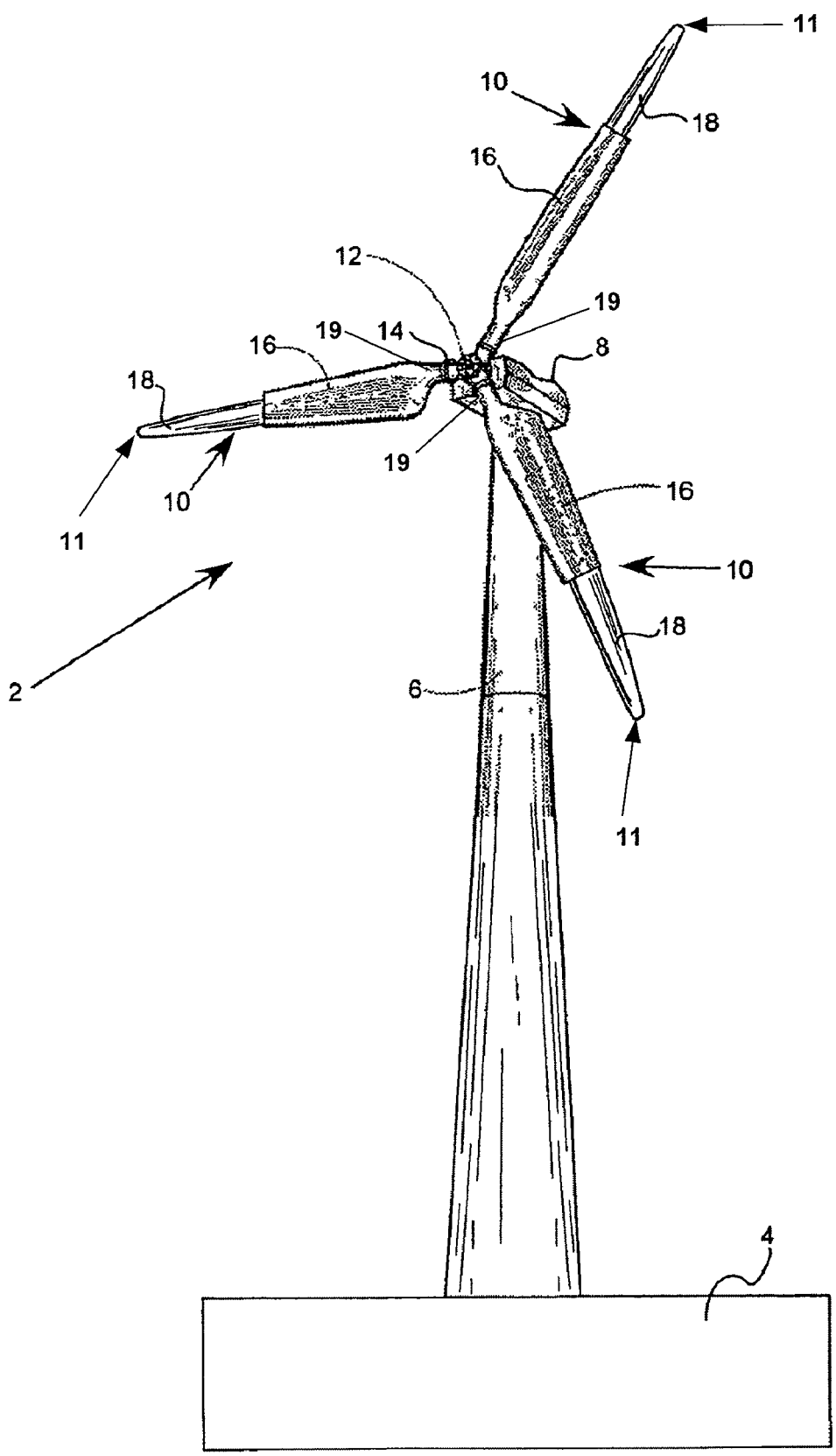
FIG. 1 illustrates an example of variable length blade wind turbine.

FIG. 1 illustrates an example of wind turbine 2. The wind turbine 2 of FIG. 1 may be considered a variable length blade wind turbine design. The variable length rotor blade of the present invention is described herein for use with an electricity-producing wind turbine 2 as shown in FIG. 1. The wind turbine 2 consists of a foundation 4, a tower 6, a nacelle 8, and a number of variable length blades 10 according to the present invention. There are typically a plurality of blades 10 (two, three, four etc.) on a power producing (capturing) wind turbine 2. Blades 10, regardless of whether they are fixed or variable length, may generally be described as having a blade tip 11 and a blade root 19. The blade tip 11 refers to the angularly most outward region of the blade 10 as is seen FIGS. 1 and 2. The blade root 19 may be generally described as an end or region opposing the blade tip 11. As such, the blade root 19 is the angularly inward most region of the blade 10 and attaches to the turbine hub 12.

The blades shown in FIG. 1 include an extendable blade section 18 and a fixed blade section 16. The blades 10 are attached to a hub 12 by a bolt flange 14. Alternatively, the blades 10 can incorporate studs that are embedded in the structure of the blade 10 and bolted to the hub 12. The bolt flange 14 on most wind turbines 2 is one of several standard sizes so that retrofitting existing wind turbines 2 with new blades 10 is relatively simple. U.S. Pat. No. 4,915,590, the teachings of which are incorporated herein by reference, describes among other things various types of blade-hub connections.

The variable length blades 10 consist of two portions. There is a fixed blade section 16 which is rigidly attached to the hub 12 and a movable blade section 18 which can be extended or retracted relative to its respective fixed blade section 16. The movable blade section 18 may be movable into a number of positions including an extended position and a retracted position. As the blades are extended, the effective diameter of the wind turbine's rotor increases. As the blades are retracted, the diameter decreases. Power production is proportional to the rotor diameter squared so that a small change in rotor diameter can provide a relatively large change in power output. Furthermore, many structural loads are proportional to rotor diameter raised to the fifth power (if the rotational speed remains constant as the blade diameter is increased) so that a dramatic reduction in loads is possible when the blades are retracted. An example of a variable length wind turbine can be found in U.S. Pat. No. 6,902,370 to Dawson et al., entitled "Telescoping Wind Turbine Blade." Applicants hereby incorporate by reference U.S. Pat. No. 6,902,370, in its entirety.

Figure 2:
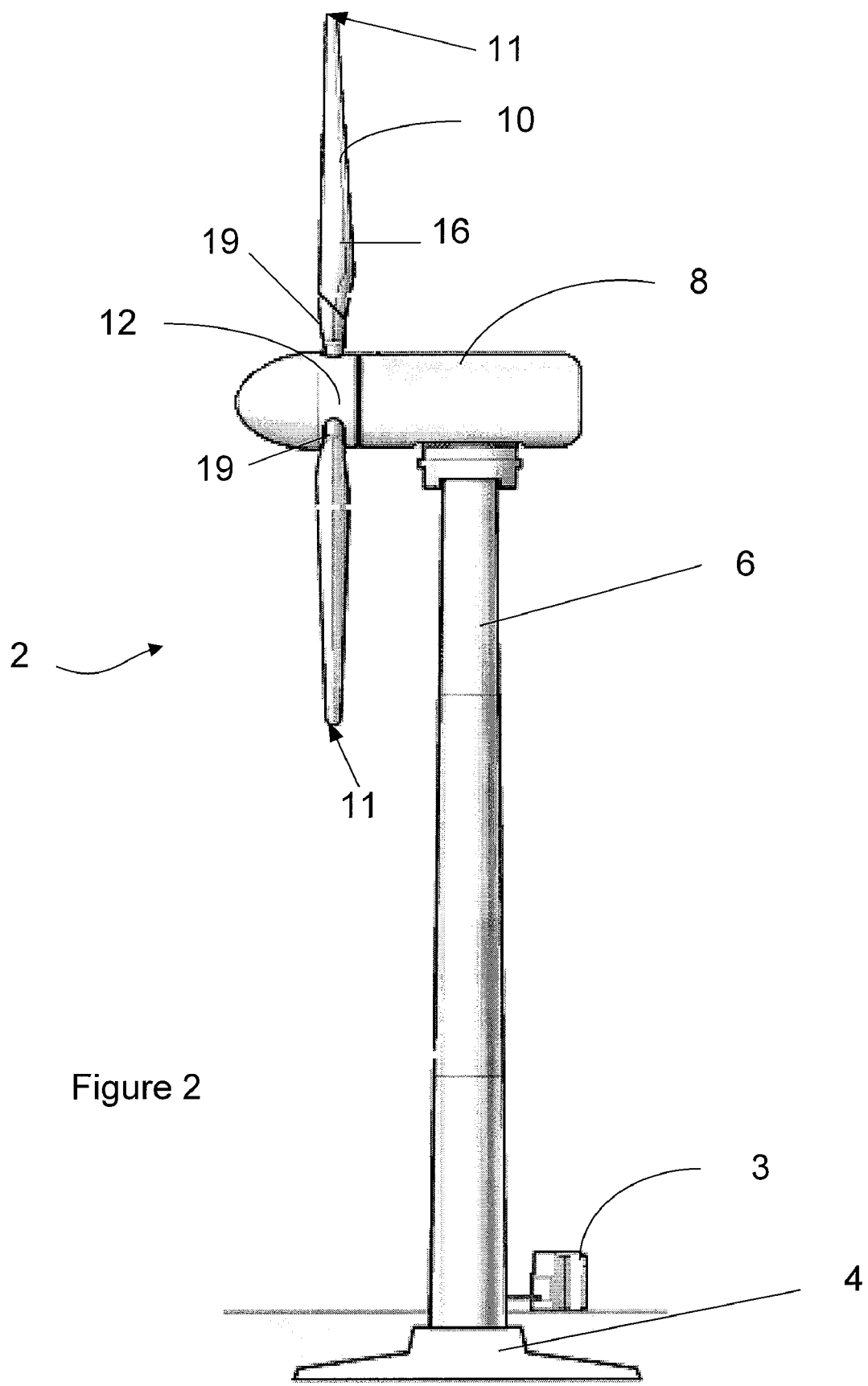
FIG. 2 illustrates an example of fixed length blade wind turbine and an associated transformer.

The rotor blades as shown in FIGS. 1 and 2 may be formed of any of a variety of suitable materials known to be used in the art. For example, rotor blades on large wind turbines are often made of glass fiber reinforced plastics (GRP), i.e. glass fiber reinforced polyester or epoxy. Reinforcing materials such as carbon fiber or aramid may also be used in rotor blades in certain instances. Steel and aluminum alloys may also be used for rotor blades especially small wind turbines. Wood, wood-epoxy or wood-fiber-epoxy composites also may be utilized. Various other materials may be used for the rotor blades as is known in the art.

Figure 3:
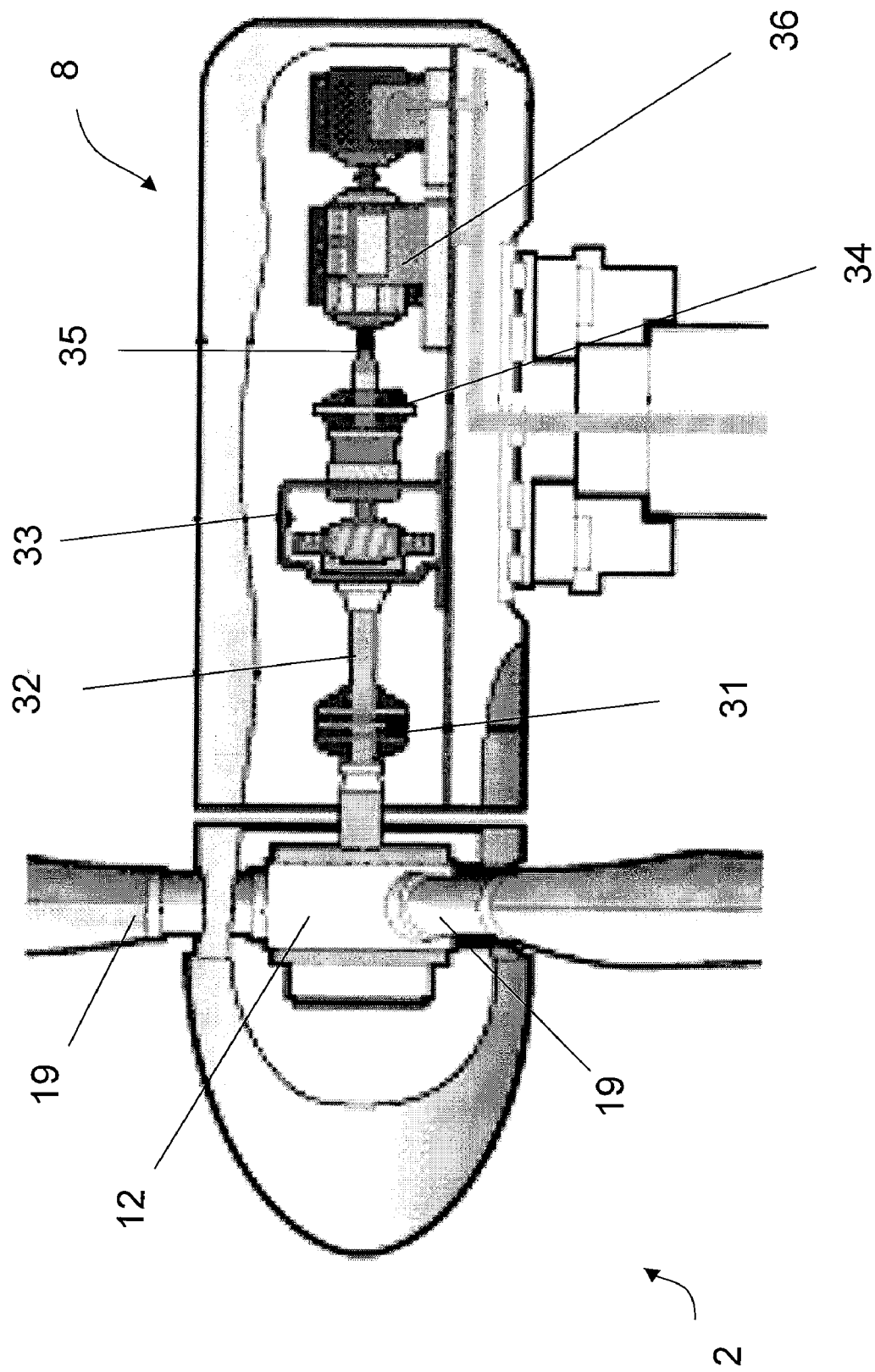
FIG. 3 illustrates an exemplary diagram of an arrangement of components of a wind turbine.

FIG. 2 illustrates an example of another arrangement of a wind turbine 2 and an associated transformer 3. For clarity and understanding, the wind turbine shown in FIG. 2 may generally be referred to as a fixed length blade wind turbine 2. Like the wind turbine 2 of FIG. 1, the wind turbine illustratively shown in FIG. 2 includes a variety of components known in the art with respect to wind turbines. Several turbine blades 10 are configured about a turbine hub 12 and are caused depending on wind characteristics to rotate about the turbine hub 12 thereby rotating one or more shafts or similar force transfer elements and components housed in the wind turbine 2. The nacelle 8, an example of which is shown in FIG. 3, often houses a variety of components for capturing, redirecting and/or utilizing the wind so as to generate power for eventual use and distribution including brakes, various shafts, gears, gearboxes, generators and various other components known in the art. As shown in FIG. 2, and similar to FIG. 1, nacelle 8 may sit on a tower 6 which often supports the power generating/harnessing portions of the wind turbine including for example the nacelle 8, the turbine hub 12 and the turbine blades 10 as well as other related components vertically above a reference surface. Similar to FIG. 1, tower 6 is supported by foundation 4.

FIG. 3 illustrates an exemplary arrangement of components of a wind turbine. For reference and understanding, FIG. 3 illustratively shows one configuration of certain components of the nacelle 8. Components housed in the nacelle 8 many include numerous variations and configurations known in the art. One such illustrative configuration is shown in FIG. 3. In operation, turbine hub 12 is rotated as a result of forces from the wind being applied to the turbine blades 10 (e.g. lift force). This force is transferred through the shown components of the nacelle 8 to a generator 36 where it is converted from rotational (kinetic) energy to electrical energy and then it is carried out of the nacelle. In this instance power is carried down the tower 6 to a transformer 3 as shown in FIG. 2, where it can be converted into a preferred form for use, storage or transfer as is known in the art.

In particular in this configuration, turbine hub 12 is movably linked to the internal components of the nacelle 8 for use in power generation or capture and control of rotation, positioning and/or movement of the turbine hub 12. One or more shafts are commonly used to transfer the rotational energy through the wind turbine such that it can be converted into electrical energy for storage, distribution or use. Low speed shaft 32 and high speed shaft 35 are shaped and configured so as to provide desired rotational energy transfer characteristics. As is commonly understood in the art, shaft circumference is often directly related to the desired rotational characteristics. Brakes 31, 34 are used for stopping or slowing associated shafts in cases of power overload, system failure, upon controller desire or in anticipation of maintenance etc. The gearbox 33 uses gears housed within to increase the speed of the shaft when one moves from the turbine hub 12 to the generator 36. As is known, increased shaft speed allows the shaft to have a higher rotational speed and allows the generator 36 to be turned at a faster speed thereby allowing power to be generated in a more efficient manner in relation to each turbine hub 12 rotation.

As mentioned, the configuration illustratively shown in FIG. 3 is one exemplary configuration of certain power generation/capture components of a wind turbine 2. Various other components not shown are known to also be utilized depending upon the characteristics of the wind turbine 2. For example, many wind turbines 2 also include one or more associated electronic control units for monitoring and control of the wind turbine. Additionally, a yaw controller may also be utilized in alignment of the turbine with the direction of the wind such that the current wind conditions are optimized to maximize power capture, minimize stress, strain or fatigue on the wind turbine including its blades 10 and blade roots 16, or other user or controller desired characteristics. Additionally, various other electrical components may be housed in the tower 6, nacelle 8 or other locations to facilitate transfer of power from the generator 36 to the transformer 3 etc. While the electrical control unit, the yaw controller, and the other electrical components described above are not shown herein, they are well known in the art and can take any form known in the art.

Wind turbines can be configured in a number of specific designs with varied characteristics based upon desire and need. A particular wind turbine may have varying designs traits based upon wind conditions, extent of surface footprint available, soil characteristics, placement such as being located alone or in a wind farm, power output requirements etc. While various specific wind turbine designs exist, wind turbines in general are sometimes susceptible to damage in light of their very function and purpose. In light of the properties of the materials preferred for turbine blades, the orientation of the blades and the wind, and other environmental conditions, wind turbines may develop holes, cracking or breaking especially the turbine blades 10. Many turbine blades 10 are made, for example, from fiberglass for its preferred characteristics and properties. Accordingly, the orientation of the glass fibers in horizontal axis wind turbines (e.g. wind turbine 2), can leave this weakened region susceptible to breaking or cracking.

Figure 4:
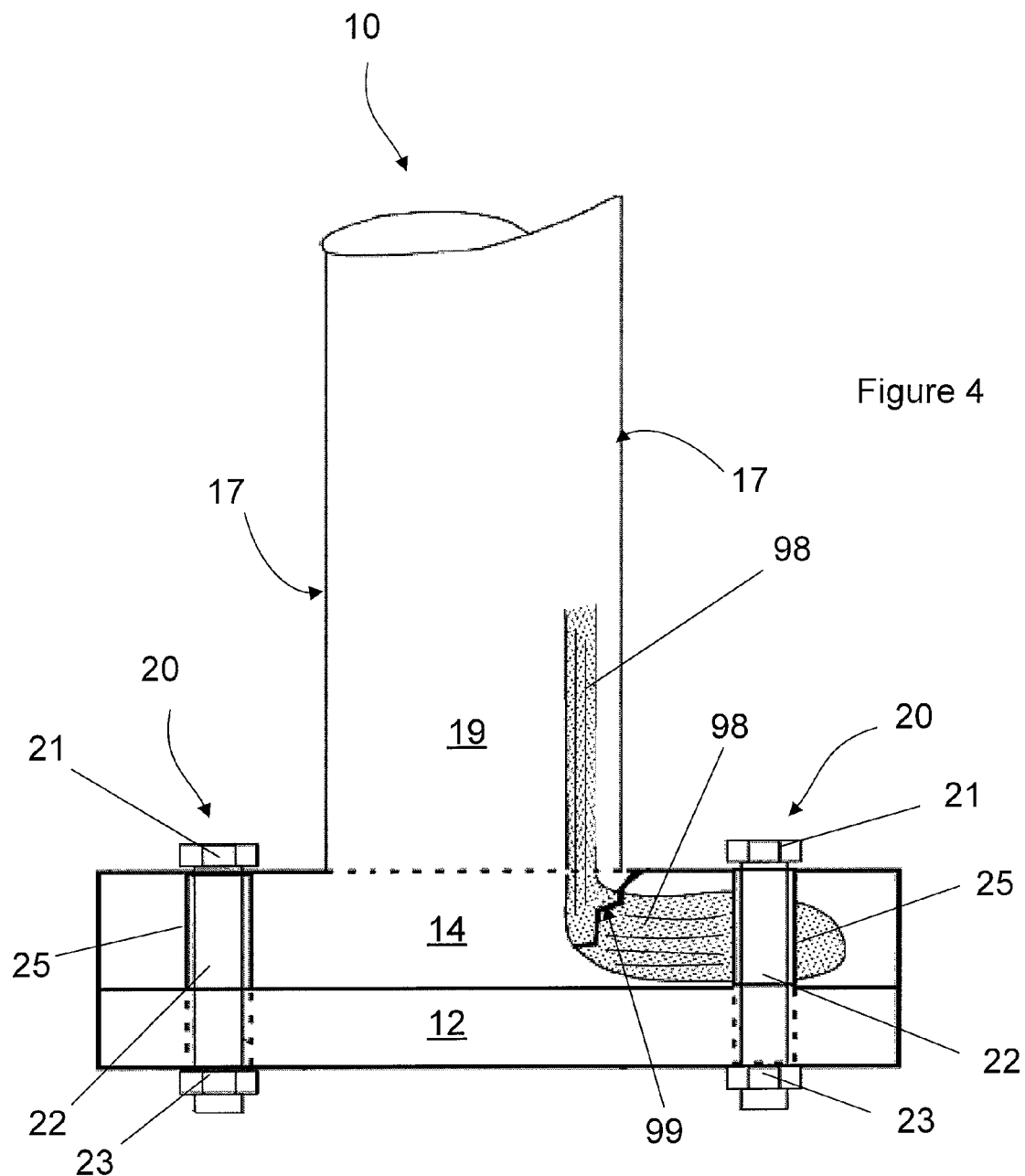
FIG. 4 is an illustrative enlarged diagram of a cross-section of a blade root in one arrangement prior to repair.
Figure 5:
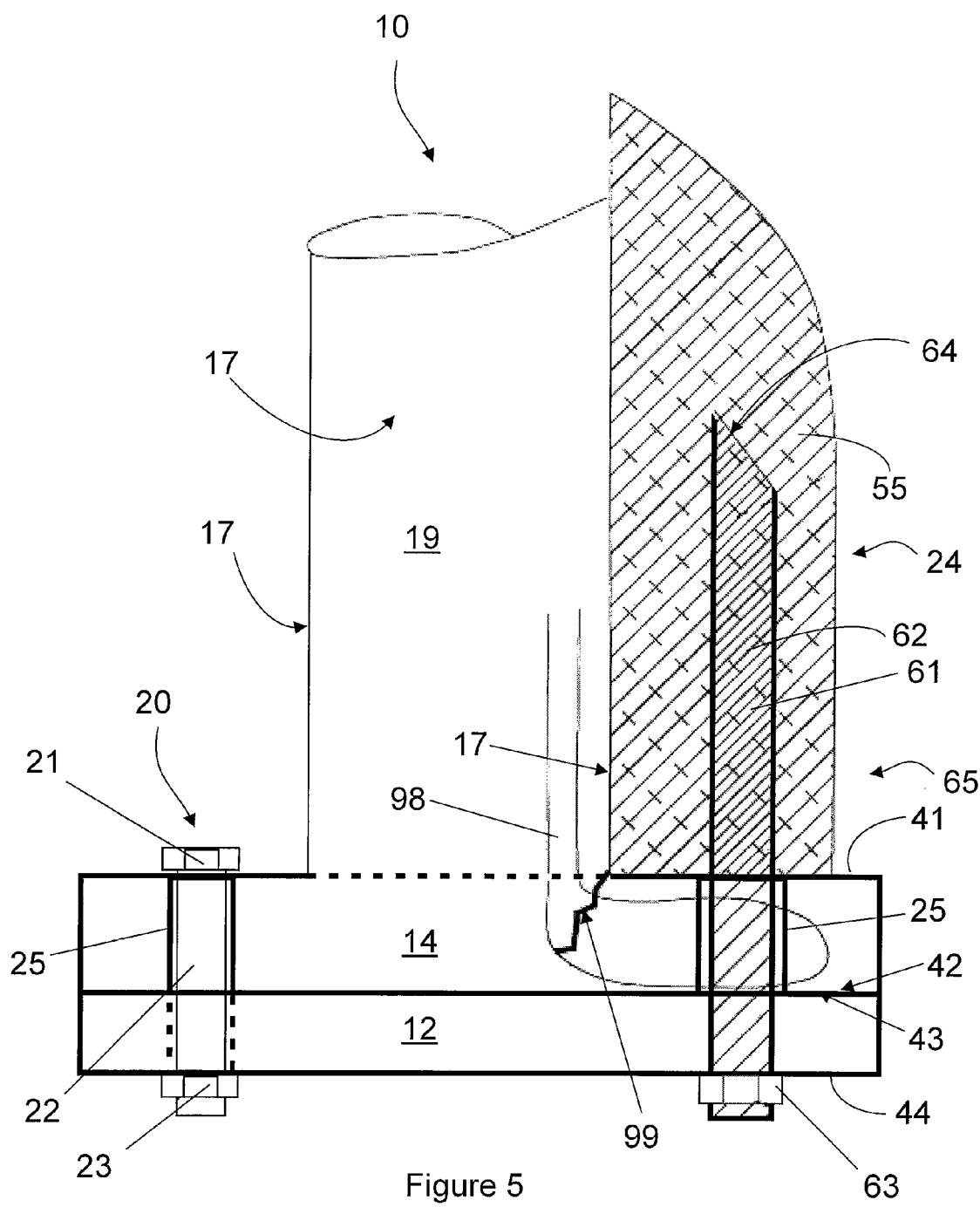
FIG. 5 is an illustrative enlarged diagram of a cross-section of a blade root in one arrangement following repair.

It is generally recognized that the region between the mounting flange 14 and the blade 10 or blade root 19 is a comparatively weak region of the turbine blade 10. In FIGS. 4 and 5, weakened region 98 illustratively shows areas where, during production of the blade root and flange, unidirectional fibers are bent around the corner (e.g., a 90 degree angle in certain configurations) in order to provide the flange structure that permits attachment and permits the blade 10 to be connected to the turbine hub 12. In this region where the fibers are bent, force applied in a direction not in line with the fibers strength can cause an area of weakness that is susceptible to breakage and fatigue. Cracks 99 may occur, such as the one illustratively shown in FIGS. 4 and 5 due to poor load path from the blade to the bolt flange. These cracks may be complete and may cause the blade to break away from the turbine. Alternatively, the crack may be partial such that the blade will remain intact. However, even a partial crack will detract from the power generation motions and capabilities of the wind turbine and may also cause damage to other wind turbine components.

Even when a blade 10 is cracked (for example crack 90 in the aforementioned weakened area 98 at a region of attachment to the turbine hub 12), the blade 10 can often be repaired and still have a long life span. Generally, it is a costly procedure to remove blades 10 from a wind turbine 12 as replacement typically requires significant equipment and labor. Accordingly, salvage and repair of cracks or breaks without removing or replacing the blade 10 will significantly reduce costs as wind turbine blade 10 life can be extended and the repair will be less costly since the extensive labor and equipment associated with removal of a turbine blade 10 will be avoided.

FIG. 4 is an illustrative enlarged diagram of a cross-section of a blade with an illustrative crack or fracture 99 in the blade root 19 prior to repair. In the enlarged diagram, structures used for connection of the blade 10 to the turbine 12 are apparent. As is apparent, the blade root 19 and the mounting flange 14 of turbine blade 10 are operably coupled to the turbine hub 12 by coupling elements 20. Here, coupling elements 20 are a pair of bolts 22. The bolts 22 include a bolt head 21 on a first end and nut 23 on an opposing second end. Further, each of the bolts 22 sits in a bolt hole 25 running through the flange 14 and the turbine hub 12. The bolts 22 may be any of a number of fasteners suitable for wind turbine applications including threaded fasteners and the like. Bolts 22 for coupling turbine blades to turbine hubs are known in the art. FIG. 4 illustratively demonstrates a portion of a wind turbine blade 10 in a first cracked or pre-repair state. As described, even if crack 99 will not cause complete failure of the blade 10, the crack 99 will detract from the power generation motions and capabilities of the wind turbine blade 10 and other components. It may also cause damage to or failure of other components. As such, unless the blade 10 can be repaired, it will need to be replaced by a costly procedure or else the wind turbine 2 will have to be turned off, or continue to operate with reduced power generation capabilities in an inefficient or dangerous manner.

FIG. 5 is an illustrative enlarged diagram of a cross-section of a blade following repair according to the method described herein. For clarity and understanding, the surfaces of the turbine hub 12 and the flange 14 have been labeled as follows below. These labels were done in reference to the center of the turbine hub 12 as a radially central most portion of the wind turbine and all the other components and elements as outward from the center of the turbine hub 12. These labels however are merely illustrative. Thus consistent with this labeling, the flange 14 may be considered as having a outer surface 41 and inner surface 42. Likewise, the turbine hub 12 may be considered as having an outer surface 43 and an inner surface 44. Accordingly, the blade 10 is typically held to the turbine hub 12 by coupling elements 20. Specifically, coupling elements 20 apply a coupling force such that the inner surface of the flange 42 and the outer surface of the turbine hub 43 are pressed together. Since the flange 14 is structurally connected to the blade root 19 as unitary structure, the entirety of the blade 10 is structurally connected to the turbine hub 12 and thus can cause the turbine hub 12 to rotate when forces caused by wind being applied to the blade 10.

Continuing with FIG. 5, repair of the blade root 19, or varying the load path on a blade root 19, as described, herein may be performed according to a variety of specific steps consistent with the general method and structures. Material is added outboard of the existing flange 14 to carry loads directly to the root end 19 of the blade. Generally speaking, material can be built directly on the blade 10. Alternatively, the material can be pre-molded blade repair sections providing a modular solution as the pre-molded blade repair sections can be quickly bonded to the blades 10. The described methods and structure for repairing a blade 10 including a blade root 19 may be used to quickly bond and repair a blade root 19 while the blade 10 remains mounted on the turbine.

The bonding material 55 used as described in reference to FIG. 5 may be any of a number of materials capable of providing sufficient structural support when in use with a turbine blade 10. For illustrative purposes, one bond that be used utilized is a fiberglass and epoxy bond. The fiberglass and epoxy bonding material 55 may be applied wet and as they are allowed to cure they solidify to form a strong bonded adhesive structure that provides support and crack and fatigue resistance. Other bonds may include composites, resins, steel, aluminum, wood or other structural material. Bonding material 55 may be composed from mixes of varying consistency ranging from plain vinyl ester resin, commercial bonding mixtures, epoxies and various mixes of fibers and fillers. Among the factors that may be considered in preparation and selection of a bond or bonding material 55 are color, ability to withstand "pull-out" where a significant pull force is applied, cost, toxicity and working time. While these variables may change based upon specific user desire criteria, certain traits are deemed generally desirable.

For example, a bonding material 55 of paste consistency allows easy workability, transportation and application in bulk to a blade root 19 especially in instances where the applicator is working in difficult or cramped conditions including elevated heights. Quick application of the bonding material 55 facilitates repair but further reduces the cost of repair as fewer man hours are spent applying the bonding material 55, leading to reduced man hours and also fewer hours the wind turbine must be out of service. It also may be preferable for the bonding material 55 to be light in color so as to render color changes as a result of hardeners to be visually perceivable and serve as a visual indicator.

While the steps of repair may be modified in certain instances, the following is generally performed in order to repair the cracked blade 10 or blade root 19 by direct application blade root repair, such as that shown in FIG. 4. First, the outer surface 17 of the blade root 19 is prepared for repair. Preparation can be done in various ways so as to ready the outer surface 17 of the blade root 17 for application of a bond or bonding material 55 or similar substance. For example, preparation may include scouring of the outer surface 17 of the blade root 19. Scouring may include preparation of the outer surface for application of bonding material 55 to form a bond. For example, the outer surface 17 may be cleaned and sanded so as to promote bonding of the fiberglass or other materials as is applicable. Other or alternative steps known in the art for preparing a surface for bonding may also be performed.

Next, one or more bolts 22 are removed from its associated bolt hole 25. In one arrangement, the removed bolt 22 is then replaced with a different coupling element 24, in particular threaded attachment 61 as is apparent in FIG. 5. Here, threaded attachment 61 is a high strength threaded rod 62 that has a nut 63 that will sit on the inner surface 44 of the turbine hub 12 while a portion of the threaded rod 62 extends "outward" beyond the outer surface 41 of the flange. For ease of explanation and clarity the portion of the threaded attachment that extends outward of the flange 14 (is on the blade 10 side of the flange 14) can be referred to as the outward rod region 65. Depending on bolt hole 25 size and character as well as needed strength characteristics for use in support the blade 10 in need of repair, the threaded attachment 61 can be made from a number of materials known in the art including metals such as various types of steel or titanium. In particular the threaded attachment often is composed of high strength or stainless steel or various other similar materials. In FIG. 5, threaded rod 62 has a tapered outward end 64. A tapered outward end 64 functions so as to reduce the stress riser created between the fiberglass and the relatively stiffer threaded attachment 61, after the root has been finished and the bond is applied. Other modifications may be made to threaded attachment 61 to improve strength or durability characteristics.

Continuing with FIG. 5, after the threaded attachment 61 has been placed in bolt hole 25, bonding may be performed. Using threaded attachment 61 as a support structure, a bonding material 55 may be placed so as to connect threaded attachment 61 with the blade root 19. The bond is applied so as to fill in certain portions of the open region between the outer surface 17 of the blade root 19 and the threaded attachment 61, here the threaded rod 62. As shown, bonding material 55 may be applied generously so as to engulf the threaded attachment 61 filling the area between the outer surface 41 of the flange 14 and the outer surface 17 of the blade root 19. As shown in FIG. 5, outward rod region 65 may include a significant portion of the length of threaded attachment 61 so as to provide a significant support structure to allow for application of the bonding material 55. Together the combination of the bonding material 55 and the threaded attachment 61 including its associated nut 63 serve as a reinforcing or structural support for a cracked blade root 19 and allow the load path to be varied.

Figure 6:
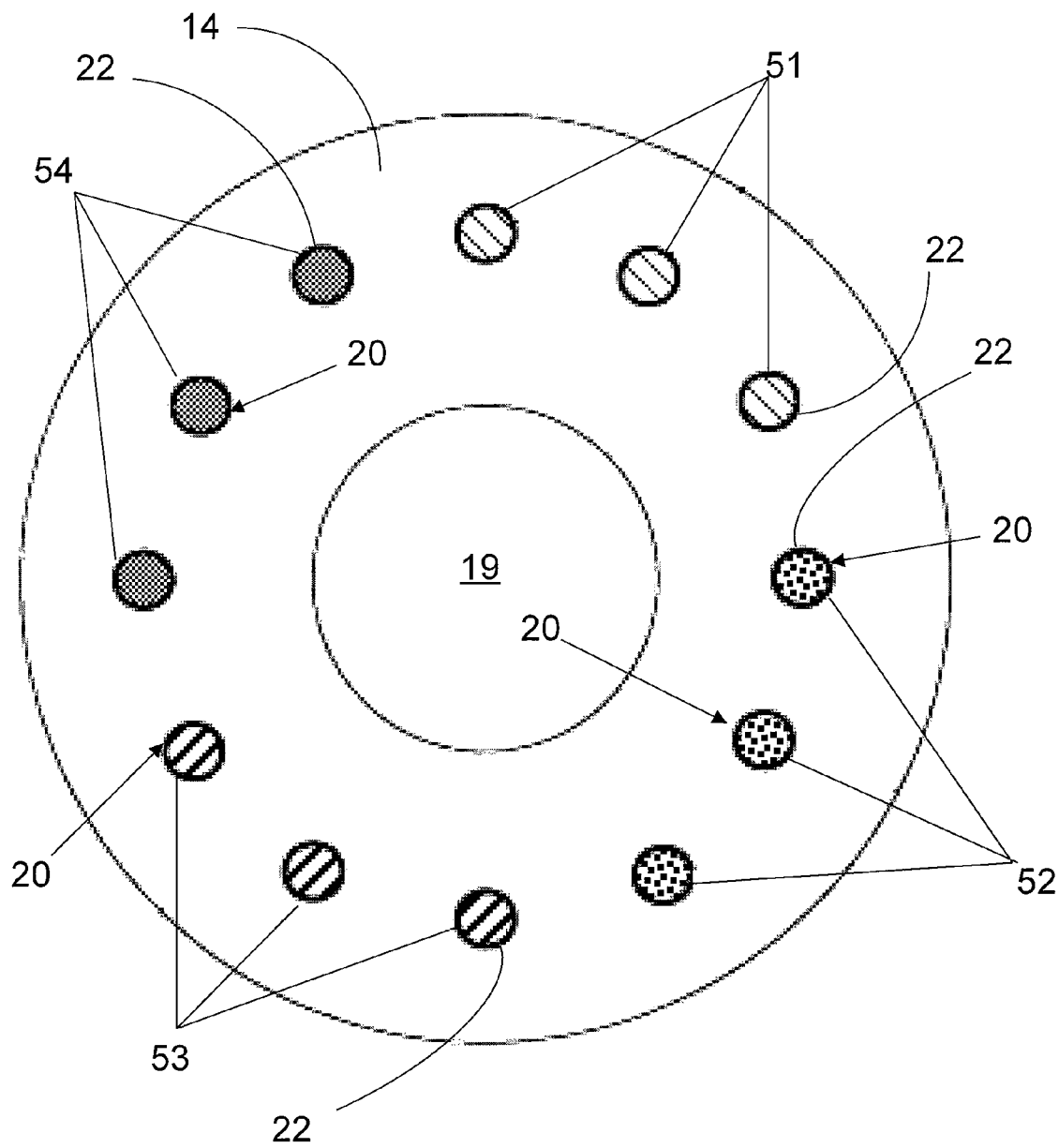
FIG. 6 is an illustrative enlarged diagram of a flange depicting coupling sections and coupling section selection and use in repair.

Just as a single bolt 22 can be removed, replaced with a threaded attachment 61, and a bond applied, this same process can be performed in sections so as to facilitate efficient and effective repair of the entire blade root 19 of a turbine blade 10. In practice, while FIG. 4 illustratively shows two (2) bolts 22, and FIG. 5 shows removal and replacement of one of the bolts 22 with threaded attachment 61, a blade root 19 is typically surrounded by bolts 22 as the blade root 19 is generally round and the coupling elements 20, often bolts 22, are angularly displaced around the circumference of the blade root 19 and housed in the flange 14 and the turbine hub 12 as shown in FIG. 6. Angularly displaced bolts 22 evenly divide the forces required to hold the blade 10 to the turbine hub 12 using the flange 14 and coupling elements 20 as shown and described.

FIG. 6 is an illustrative enlarged diagram of a flange 14 depicting coupling sections and their selection and use in repair. As described, bolts initially are placed so as to surround the blade root 19. While not universally arranged in this manner, typically these coupling elements 20 (e.g. bolts 22) are equally spaced around the blade root 19. Each blade may weigh as much as several hundred to thousands of pounds in larger wind turbines 2. As such, a certain number of coupling elements 20 must remain in place while others are removed and replaced by threaded attachments 61 and then bonded. Accordingly, FIG. 6 illustrates grouping of various coupling elements 20 into sections such that removal of all of the coupling elements of one section can be performed and the coupling elements 20 of the remaining sections possess sufficient strength to support the weight of the blade thereby holding the blade 10 to the turbine hub 12 without permitting certain components to deform, crack, or become otherwise deformed or break. For illustrative purposes consider FIG. 6 a cross-sectional view of a blade root 19 similar to those of FIGS. 4 and 5. Accordingly, in this illustrative example the coupling elements 20 may be divided into four angularly spaced sections of coupling elements 20, the first section 51, the second section 52, the third section 53, and the fourth section 54.

When repairing a blade root as shown in FIG. 6, the coupling elements 20 (e.g. bolts 22) of the first section 51 can be removed. The surface 17 of the blade root 19 may be prepared for bonding. It may be sanded, filed, scoured or the like. Next threaded attachments 61 may be placed in the bolt holes 25. (See e.g., FIG. 5) In the illustrative example of FIG. 6, three (3) threaded attachments 61 may be placed in each of the three bolt holes 25 (not specifically shown in FIG. 6) vacated by the bolts 22 in first section 51. Next, the bonding material 55 is applied as was previously described. In order to permit first section 51 to be worked on and for the bonding material 55 to dry appropriately, second section 52, third section 53 and fourth section 54 are configured and positioned so as to be able to support the entirety of the blade without assistance from first section 51. Accordingly, while the sections here each consist of three coupling elements 20 in sequence, the sections may alternatively be formed in any manner that allows removal and replacement of the original coupling elements with threaded attachments 61 so as to facilitate bonding and repair as described above.

After the bonding material 55 has been applied and cured, surrounding threaded attachments 61 (e.g. threaded rods 62) and the associated outer surface 17 of the blade roots 16 in the first section 51, the same steps may be performed with respect to each of the second, third and fourth sections 52, 53, 54 respectively. In each section, the same type of threaded attachment 61 may be utilized. Alternatively, depending on parameters of the wind turbine 2 configurations etc., varied threaded attachments 61 could also be utilized if desired. The processes described are repeated until repair has been done on all the sections of coupling elements 20. After coupling elements 20 have been replaced with threaded attachments 61, bonding material 55 has been applied and has set as described, a finishing treatment or surface treatment may be applied. The surface treatment layer may be considered as an outer wrap of the blade root 19 after all of the threaded attachments 61 and bonds 55 have been applied. For example, a layer of fiberglass may be applied around the entire section of the blade. This may provide a smoothed exterior comparable to the original surface prior to repair. The surface treatment may be applied to form a smoother outer surface than exists during repair of the blade root 19. The surface treatment may provide additional strength and help form the individual sections into a single structural element. However, depending on user preference, the surface treatment may be omitted and the wind turbine blade may be placed in service without application of a surface treatment.

Figure 7:
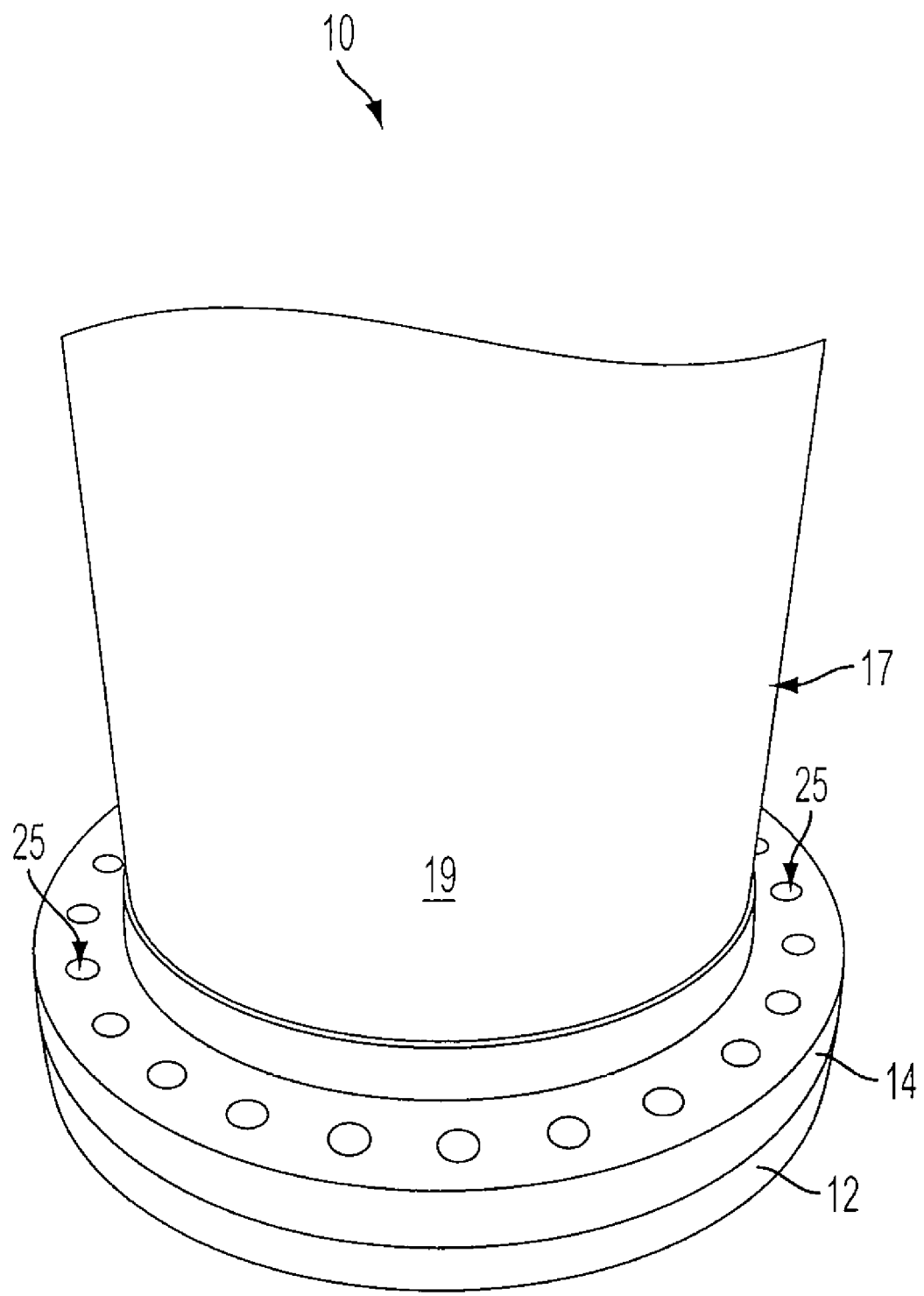
FIG. 7 is an illustrative perspective view of a section of a turbine blade root mounted on a hub extender.

FIG. 7 shows an illustrative perspective view of a turbine blade root 19 sitting on a portion of a turbine hub 12 to which the blade root 19 is attached when in service, as alluded to previously prior to repair. Repair of the blade root 19, or varying the load path on a blade root 19, as described, may be performed according to a variety of arrangements and specific steps consistent with the described methods and structures. Generally, material is added outboard of the existing flange to carry loads directly to the root end 19 of the blade. Previous, the repair process was described in an arrangement in which material was built directly on the blade root 19. The repair process may also be performed by adding material as pre-molded blade repair sections.

As shown in FIGS. 8A, 8B, 8C, 8D and 9, an exemplary modular (pre-molded) arrangement of the described repair methods and structure facilitates quick repair and can be performed without removing the blade 10. In particular, a securing collar 80 for securing the blade 10 to a blade root 19 (e.g. a blade root already in service) may be formed by assembling together and adhering or bonding to the blade root 19 a plurality of pre-molded sections 85 of the securing collar 80. As illustratively shown, a blade root 19 exhibiting wear, cracking or other fatigue may be repaired and the applied load path varied by constructing a securing collar 80 formed by a plurality of pre-molded sections 85. First, sizing of the pre-molded sections is determined depending on the size of the blade root 19. Using a bonding material 55 as previously described, numerous pre molded sections 85 may be formed in anticipation of attachment to the blade root 19. These sections may be formed on site where the previously described wind turbine 2 is located or else off site where further tools and machinery to assist in manufacturing of the pre-molded sections 85 may be located.

Figure 8A:
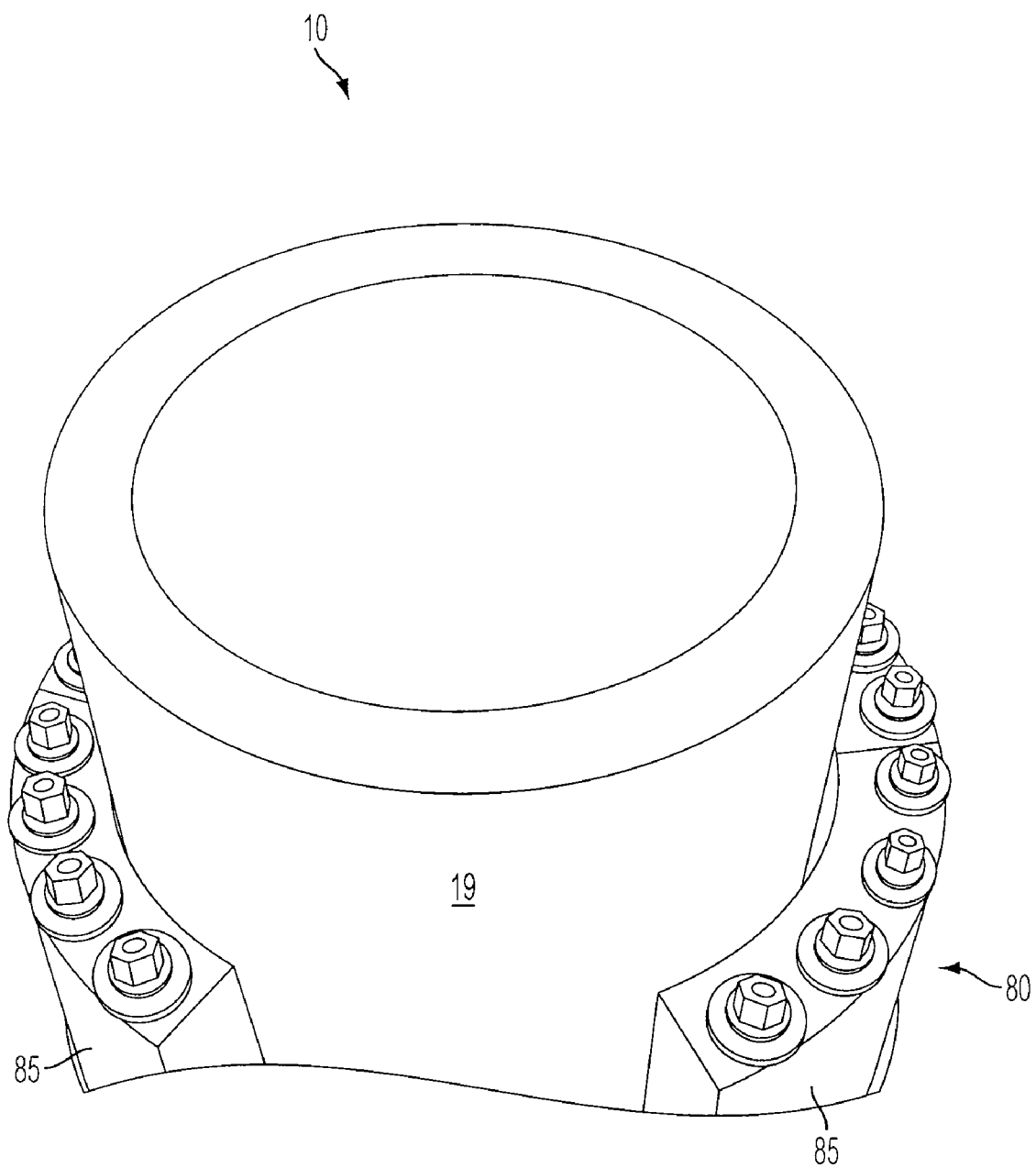
FIGS. 8A through 8D are illustrative perspective views of a portion of a blade root with attached pre-molded sections and pre-molded sections in isolation respectively.
Figure 8B:
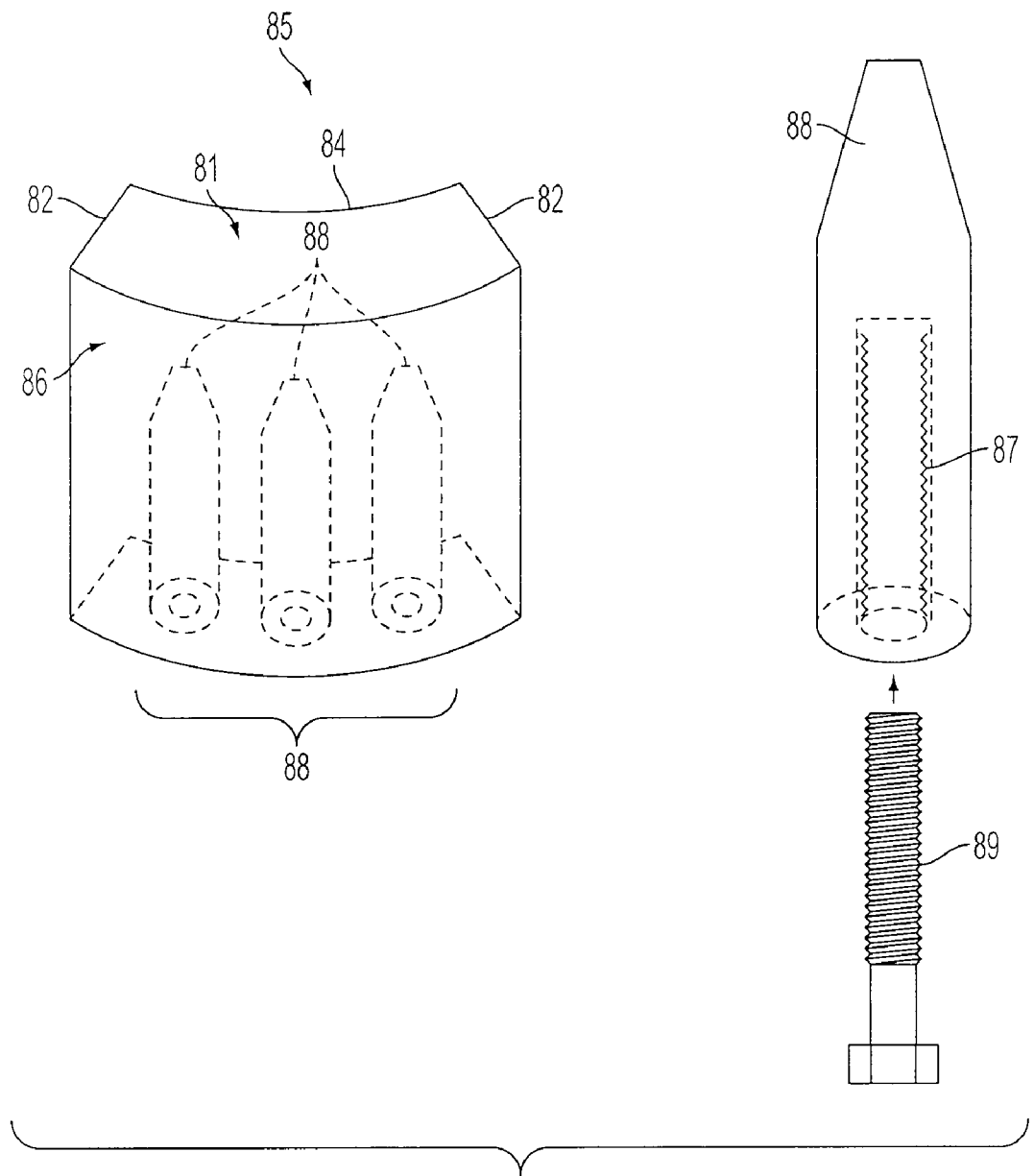
Figure 8C:
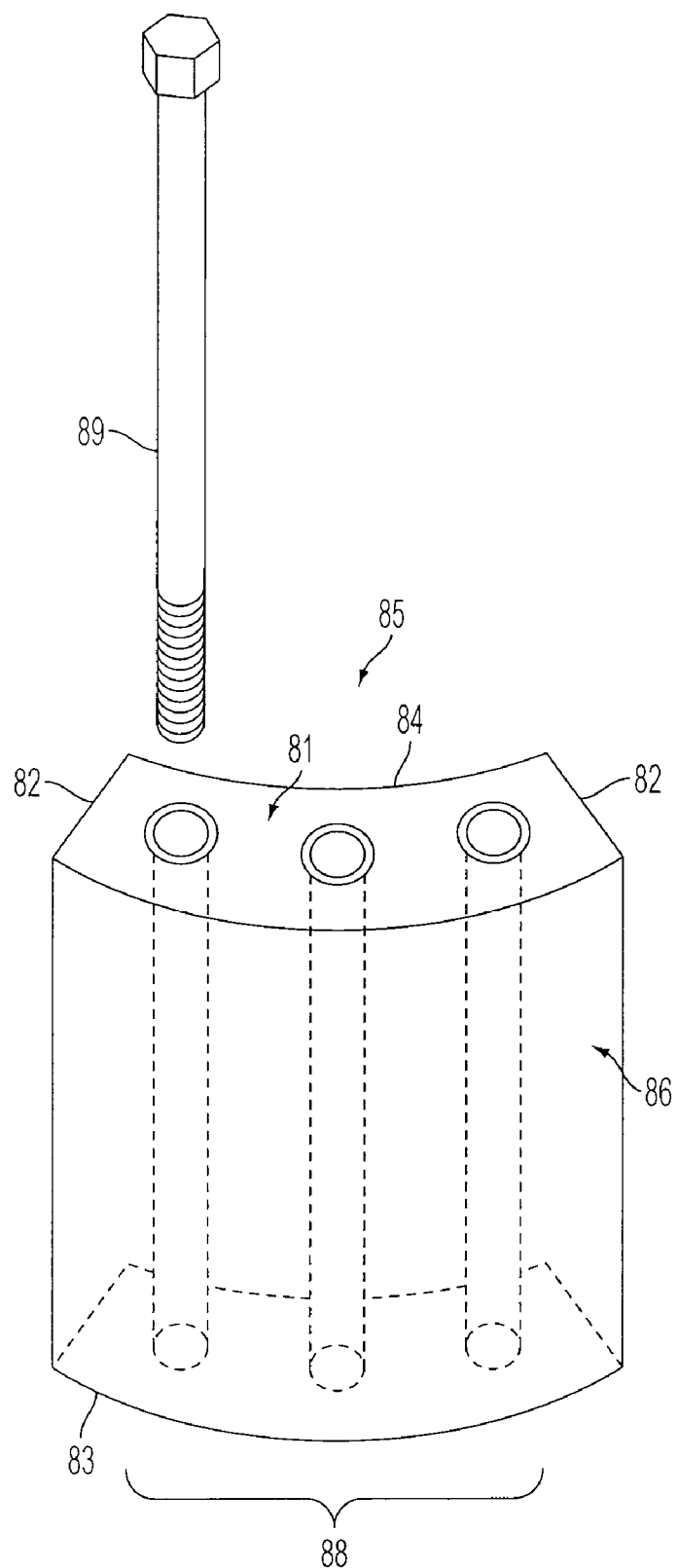
Figure 8D:
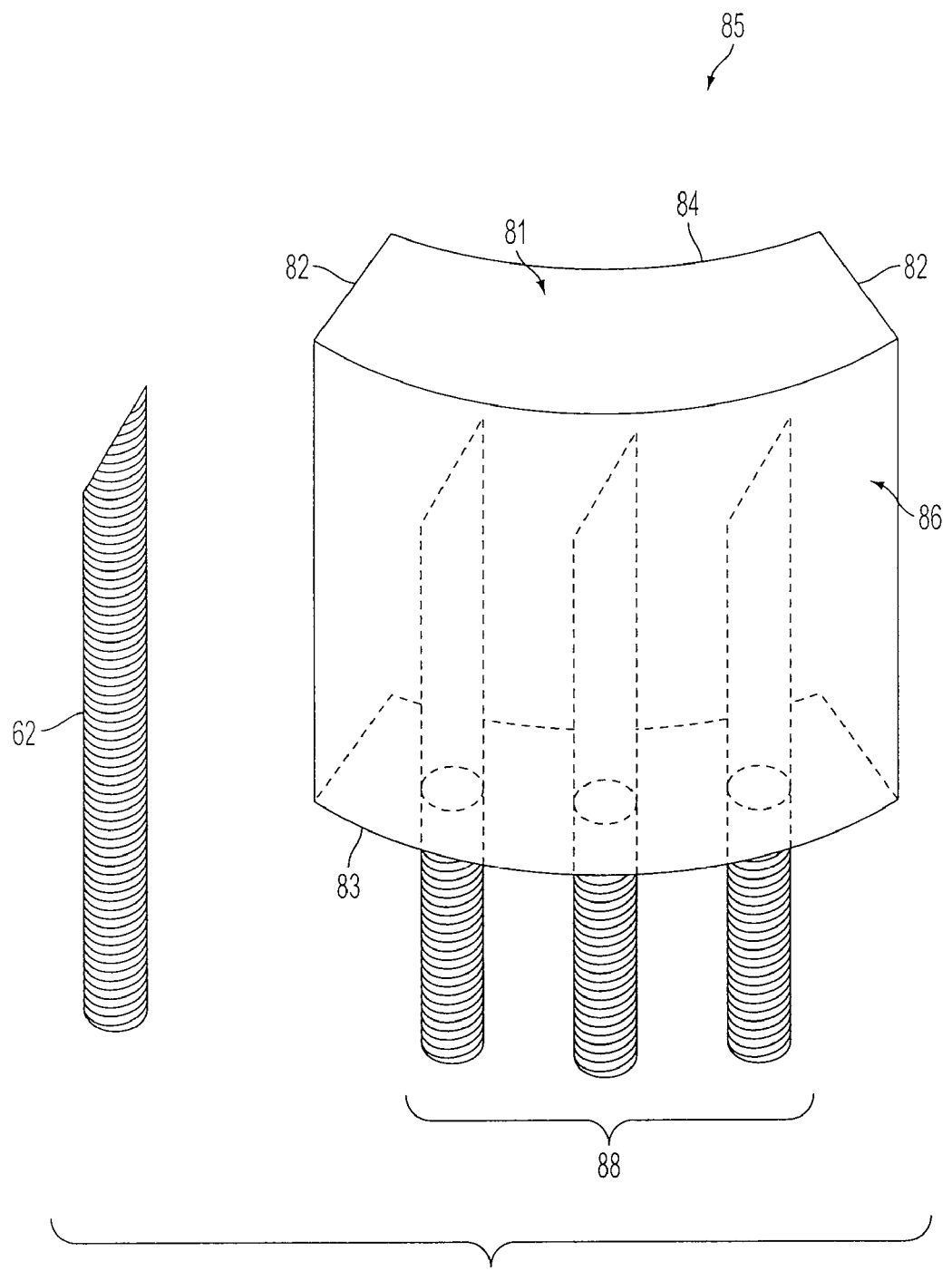
Figure 9:
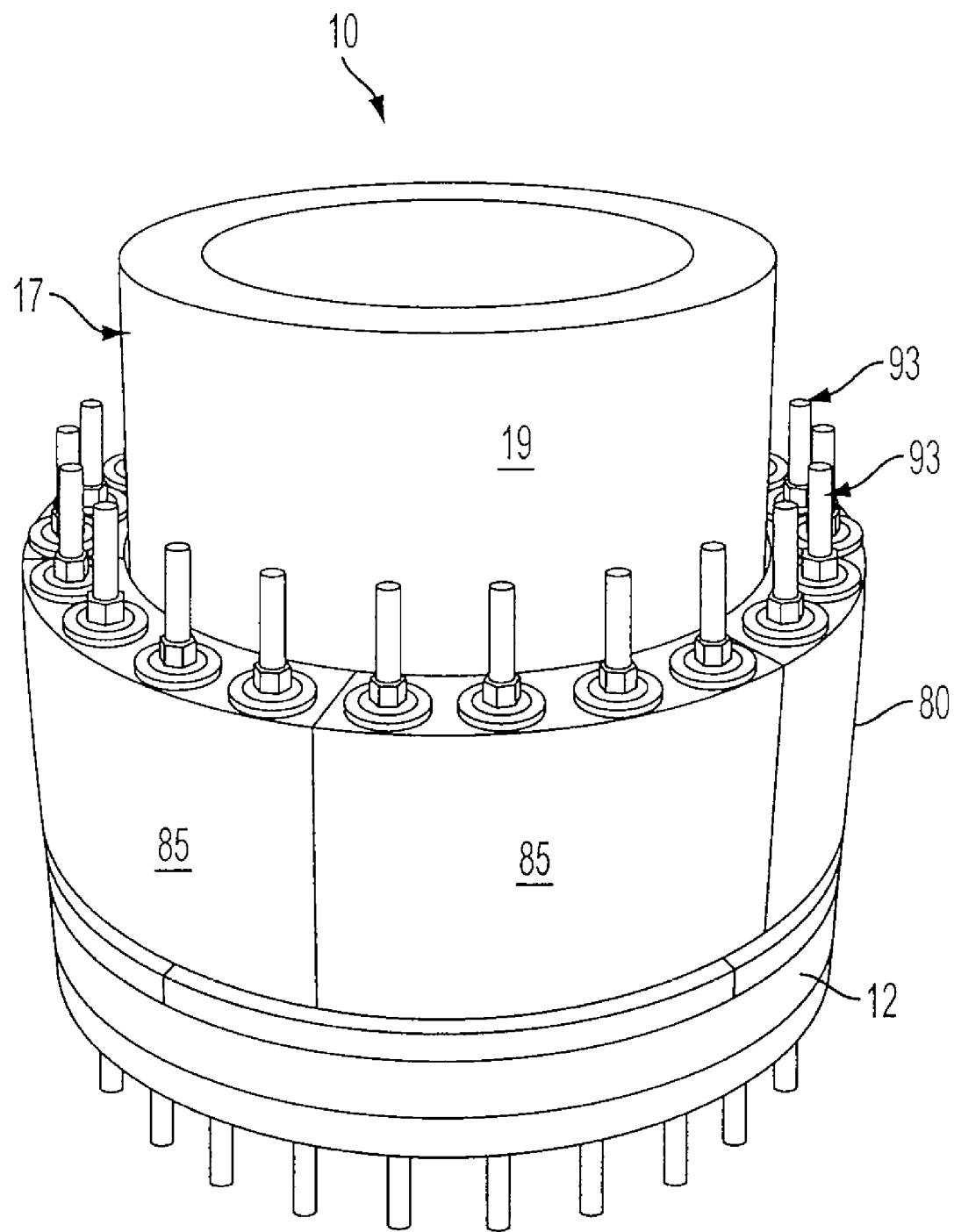
FIG. 9 is an illustrative perspective view of another exemplary arrangement of a blade root with pre-molded sections attached during repair.

As shown in FIGS. 8B, 8C and 8D, each pre-molded section 85 may be formed to have a top surface 81, bottom surface 83, sides 82 and interior and exterior surfaces 84 and 86. Because the blade root 19 often has a circular outer surface, one arrangement is for the pre-molded sections 85 to have a curved or rounded shape. In particular, concave interior and convex exterior surfaces may be formed so as to be complimentary in shape and curve radius with blade root 19 as is illustratively shown. The pre-molded sections 85 typically also house a series of attachment elements 88. Attachment elements 88 may include either male or female connector features. For example, in FIG. 8B, the female configuration attachment elements 88 may be formed as a metal insert with an internally threaded hole 87, into which a bolt 89 can be threaded. In another example, in FIG. 8C, the female configuration attachment elements 88 may be lined or unlined cylindrical holes configured to receive bolts 89, rods, drill rods, pipes or other high strength elongated structures designed to pass completely through the attachment elements 88. In a third arrangement, as shown in FIG. 8D, the attachment elements 88 may be a male configuration including threaded rods 62 as previously described, embedded studs, threaded bolts, or tubing. These pre-molded sections 85 are bonded or held together with resins, epoxies and other adhesives as described herein and as otherwise known in the art. The particular arrangement for securing the attachment elements 88 to form the securing collar 80 is illustrative, and one skilled in the art will recognize various other specific configurations may be utilized consistent with a male-female complimentary arrangements.

As described before, when repair is begun, the blade root surface 17 may be prepared for repair which may include sanding and cleaning the surface. Preparation of the blade root surface 17 is performed to facilitate the attachment of the pre-molded sections 85 of the securing collar 80. To form the securing collar 80, an adhesive or bonding material is applied to the surface of the pre-molded section 85. In this arrangement, a bonding material is applied to an interior surface 84 and the interior surface 84 is placed against the outer surface 17 of the blade root 19. The bonding material is cured and may be held against the blade root 19 and/or the flange 14 under pressure.

For example, after the bonding material has been applied and the pre-molded sections 85 are placed in their desired locations, the bolts or studs housed within the pre-molded sections 85 are tightened to help secure the pre-molded sections 85 in place. Tightening of the bolts or studs applies pressure that holds the pre-molded sections 85 to the bonding material to facilitate bonding and securing of the pre-molded sections 85 to the blade root 19. Typically, these bolts or studs are tightened before the bond hardens in order to prevent unwanted loads that could occur if bolts or studs are tightened on a misaligned pre-molded section 85 after bonding. Tightening the bolts also, as described, firmly holds the part in its desired final position while the bond cures.

After the adhesive or bonding material has cured, dried or otherwise stabilized so as to provide adhesion qualities, the next pre-molded section 85 may be attached in similar fashion. Further, in certain arrangements bonding material may be applied to the sides 82 of the pre-molded sections 85 to provide further strength and to facilitate attachment of the pre-molded sections 85 to the blade root 19 as well as to the remainder of the pre-molded sections 85 to form the securing collar 80. FIG. 8 demonstrates several pre-molded sections 85 arranged about a blade root 19. In this figure, a space is apparent where one further pre-molded section 85 is to be placed to form the securing collar 80.

Figure 10:
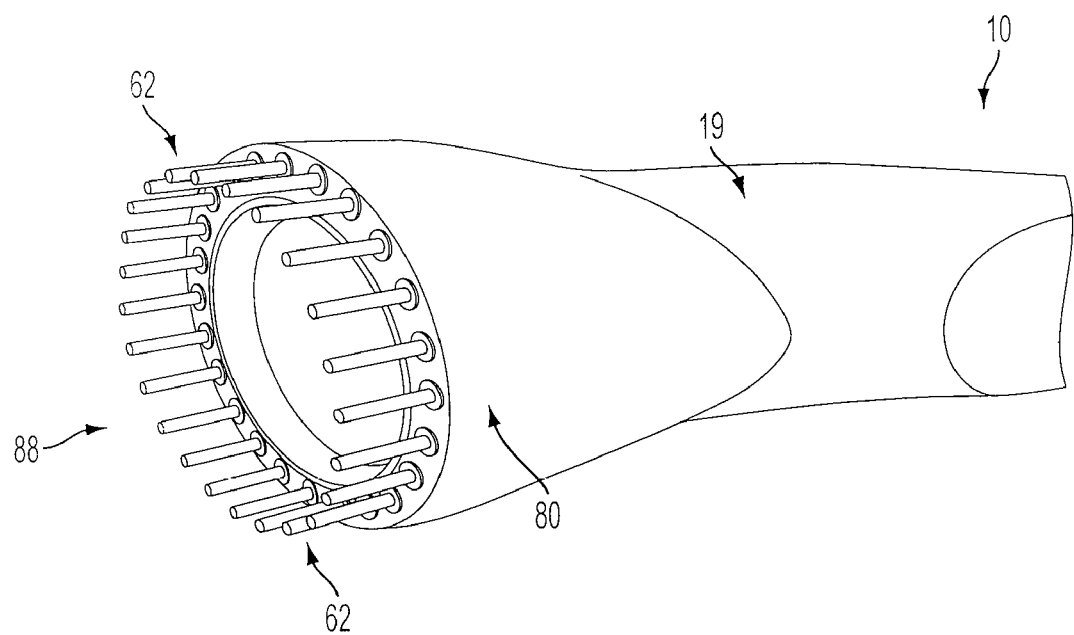
FIG. 10 illustrates a portion of a turbine blade with a plurality of rods bonded to the exterior.

FIG. 10 illustrates how, in new blade construction, a similar securing collar 80 may be created as part of the manufacturing process, with the final result similar to that described for the repaired blades 10 described above. In this case, a male configuration is shown, with protruding threaded rods Instead of using pre-molded sections 85, the attachment elements 88 may be held in a positioning jig and incorporated into the blade 10 during fabrication. Alternatively, a new blade can be built with a plain blade root 19 that does not contain any attachment elements 88. Attachment elements 88 can then be added as an additional step later in the manufacturing process. This allows varying numbers of bolts 89, or different coning or pitch angles to be built into a standard blade 10 so it might fit various wind turbines. Addition of attachment elements 88 to a plain blade root 19 as an additional manufacturing step can be accomplished by using pre-molded sections 85, or by holding the attachment elements 88 in a positioning jig and building up additional supporting structure to incorporate them into the finished blade 10.

Figure 11A:
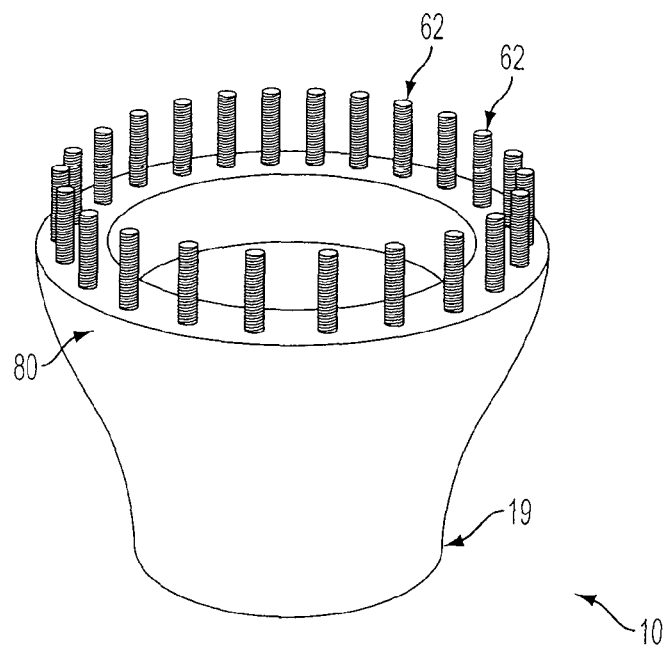
FIGS. 11A and 11B illustrate examples of blade securing structures of a turbine blade shown in a repaired portion of the blade root.
Figure 11B:
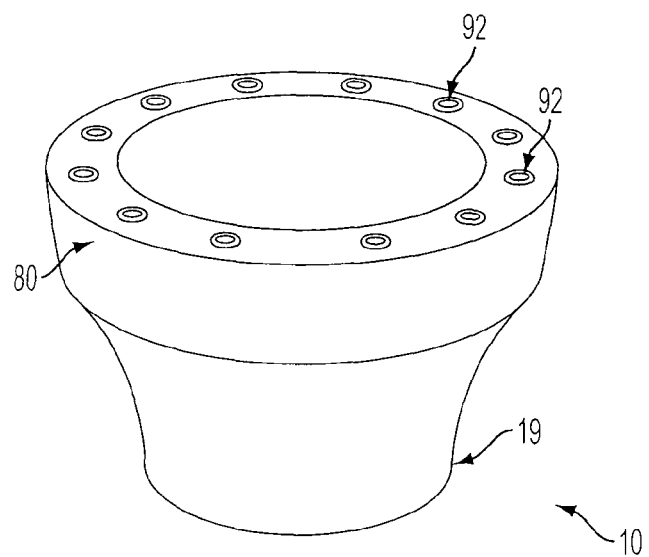

FIGS. 11A and 11B illustrate two arrangements of securing collars 80. FIG. 11A illustrates a securing collar 80 of a blade root 19 configured as a series of all-thread rods 62 (a male type connector) angularly positioned about the perimeter. FIG. 11B illustrates a blade root 19 in which the securing collar 80 forms an insert style root (a female style connector). Each is configured for use in securing the blade root 19 to a turbine hub (not shown). As such, the connection provides an attachment of sufficient strength to withstand the loads in terms of direction as well as magnitude placed upon the connection as a result of operational use including the weight of the blade at rest as well as in rotation. The connection is also configured to withstand load from the wind and other environmental circumstances.

Figure 12A:
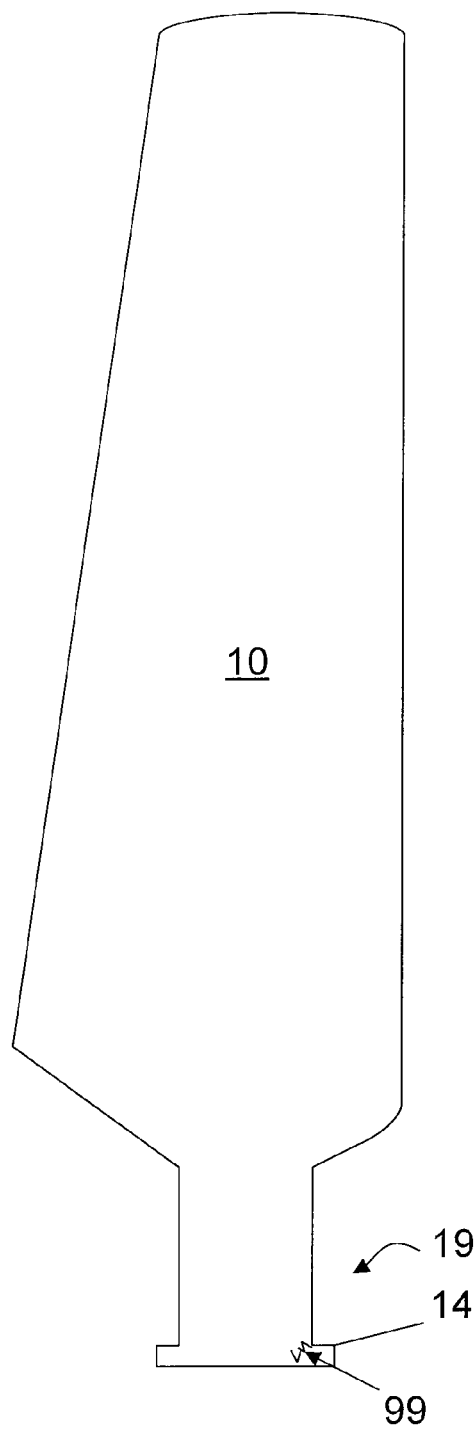
FIGS. 12A and 12B are illustrative schematic diagrams of a turbine blade before and after repair.
Figure 12B:
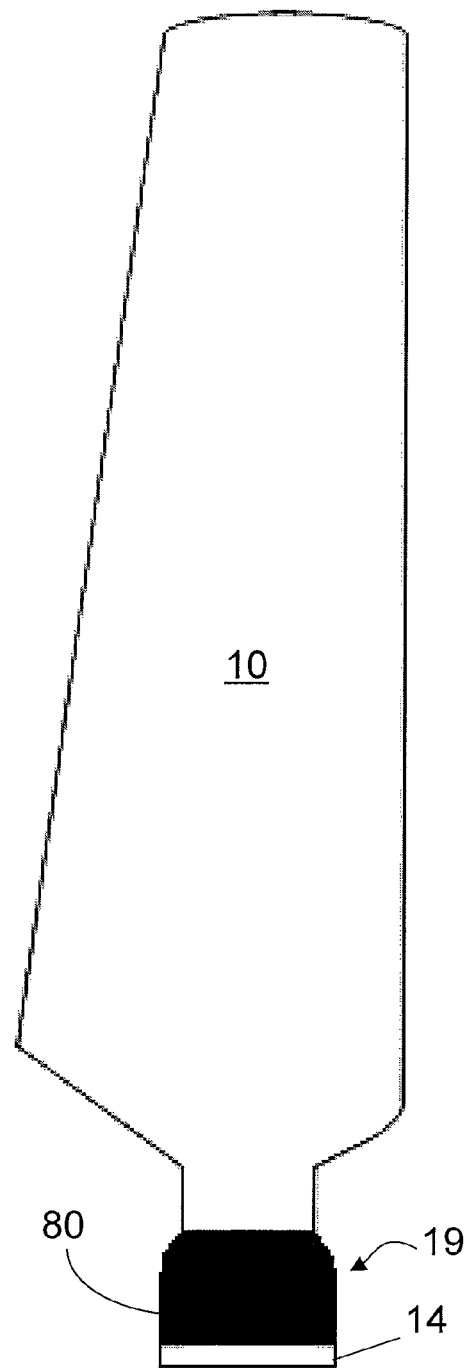

FIGS. 12A and 12B are illustrative schematic diagrams illustrating a blade 10 after repair according to the methods described herein. Fiberglass is among the more commonly used materials for turbine blades 10 because of its long fibers, which result in desirable weight and strength characteristics. However, these long glass fibers tend to break, crack or weaken in a region in which the fibers are formed about a corner, bend or other non-linear alignment. This tendency to break, crack or weaken is exacerbated when fiberglass formed in a corner, bend or other non-linear arrangement is then subjected to continuous reversing loads, such as those experienced by a rotating wind turbine blade 10.

For example, as shown in FIG. 12A, cracking 99 sometimes occurs in such an arrangement where fibers from the blade root 19 are bent to form the mounting flange 14. Accordingly, repair may be performed according to the described method for applying reinforcing structure to the weakened or cracked region so as to vary the load path placed on the blade root 19. As described, this method includes various arrangements including direct application or application of pre-molded material, with either male or female arrangements. After the repair method has been applied, the blade 10 and the blade root 19 in particular can be seen as having a repaired or reinforced configuration as is apparent in FIG. 12B, which shows the completed, thickened securing collar 80. The new securing collar 80 forms a load varying structure which carries loads from the blade to the hub (not shown) through a new path which bypasses the weakened or cracked original load carrying path. These figures are illustrative of the above described repair methods, however further specific arrangements are contemplated consistent with the invention described herein.

The techniques and structures described herein may be described in reference to repair of a blade root. However, it is recognized by one of skill in the art that these techniques and structures are applicable to new construction of blades as well. The technique and structures allows changes in coning and clocking of the attachment hardware. Accordingly, this can be used to prevent blades from striking the tower, a concern associated with variable length blades. If used blades are to be placed on a different turbine, new bolt patterns may be applied which may also be in different coning or clocking orientations to match the characteristics of the new turbine. Such a process or maneuver would not be performed in the air, but rather in a state or location removed from the wind turbine 2.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method for repairing a blade of a wind turbine, comprising the steps of:
preparing an outer surface of a blade root of a blade for repair; and
attaching a load shifting structure around an outer surface of the blade root, the load shifting structure configured to vary a load path of the blade when in use,
the step of attaching a load shifting structure further comprising:
removing a first bolt configured and positioned to facilitate coupling of a blade flange to a turbine hub and replacing the first bolt with a threaded attachment in a first bolt hole; and
applying a bonding material to a region adjacent to the threaded attachment and the outer surface of the blade root so as to bond the blade to the threaded attachment.

2. The method for repairing a blade of a wind turbine of claim 1, comprising the steps of:
removing a first plurality of bolts of a first coupling section;
replacing the first plurality of bolts with a first plurality of threaded attachments;
applying a first bond to the first plurality of threaded attachments and the outer surface of the blade root.

3. The method for repairing a blade of a wind turbine of claim 2, further comprising the steps of:
removing a second plurality of bolts of a second coupling section after the first bond has sufficiently hardened such that at least the first coupling section including the first plurality of threaded attachments, are configured to hold the flange to the turbine hub during removal of the second plurality of bolts;
replacing the second plurality of bolts with a second plurality of threaded attachments; and
applying a second bond to the second plurality of threaded attachments and the outer surface of the blade root.

4. The method for repairing a blade , of a wind turbine of claim 3, wherein each of the plurality of threaded attachments includes a threaded rod and a complimentary nut configured to provide a coupling force on the flange to for coupling the blade root to the turbine hub.

5. The method for repairing a blade of a wind turbine of claim 1, the step of attaching the load shifting structure around the outer surface of the blade root further comprising:
forming a plurality of pre-molded sections housing a plurality of attachment elements; and
bonding the plurality of pre-molded sections to the blade root.

6. The method for repairing a blade of a wind turbine of claim 5, wherein the plurality of pre-molded sections are bonded to the blade root to form a collar, the collar circumscribing the outer surface of the blade root.

7. The method for repairing a blade of a wind turbine of claim 6, wherein the plurality of pre-molded sections being bonded to the root of the blade by applying a bonding material to the blade root and positioning and securing the pre-molded sections to the blade root by tightening the attachment elements before the bonding material has substantially hardened.

8. The method for repairing a blade of a wind turbine of claim 1, wherein the method for repairing the blade of the wind turbine is performed without removing the blade from the wind turbine.

* * * * *